(12) United States Patent
Dowty et al.

(10) Patent No.: US 8,360,516 B2
(45) Date of Patent: Jan. 29, 2013

(54) PASSENGER SEAT WITH SINGLE ACTUATOR SEAT MECHANISM

(75) Inventors: Mark Brian Dowty, Rural Hall, NC (US); Tracy N. Pence, King, NC (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 13/477,428

(22) Filed: May 22, 2012

(65) Prior Publication Data

US 2012/0228919 A1    Sep. 13, 2012

Related U.S. Application Data

(63) Continuation of application No. 12/754,000, filed on Apr. 5, 2010, now Pat. No. 8,201,876.

(60) Provisional application No. 61/166,476, filed on Apr. 3, 2009.

(51) Int. Cl.
*A47C 1/035* (2006.01)
*B60N 2/20* (2006.01)

(52) U.S. Cl. .................... 297/85 M; 297/83; 297/86

(58) Field of Classification Search ............... 297/68, 297/83, 85 M, 86, 317, 318, 320, 322, 330, 297/423.31, 423.32
See application file for complete search history.

(56) References Cited

U.S. PATENT DOCUMENTS

| 246,652 | A | * | 9/1881 | Bailey | 297/75 |
| 2,869,617 | A | * | 1/1959 | Schliephacke | 297/85 R |
| 2,932,346 | A | * | 4/1960 | Schliephacke | 297/85 R |
| 4,333,681 | A | * | 6/1982 | Nelson | 297/83 |
| 4,365,836 | A | * | 12/1982 | Jackson et al. | 297/85 M |
| 4,795,214 | A | * | 1/1989 | Holdt | 297/84 |
| 5,082,324 | A | * | 1/1992 | Harada et al. | 297/83 |
| 5,918,942 | A | * | 7/1999 | Olsen | 297/423.32 |
| 6,688,691 | B2 | * | 2/2004 | Marechal et al. | 297/317 |
| 6,899,393 | B2 | * | 5/2005 | Garland | 297/83 |

* cited by examiner

*Primary Examiner* — Peter R. Brown
(74) *Attorney, Agent, or Firm* — Shumaker, Loop & Kendrick, LLP

(57) ABSTRACT

A passenger seat includes a rigid frame, a seat pan supported by the frame and movable relative to the frame, a leg rest pivotally attached to a forward end of the seat pan, a seat back pivotally attached to a rearward end of the seat pan, and a single actuator linked to the leg rest such that extension of the actuator causes the leg rest to pivot forward, the seat pan to move forward, and the seat back to recline. A method of adjusting the passenger seat includes activating the actuator such that extension of the actuator causes the leg rest to pivot forward, the seat pan to move forward, and the seat back to recline.

15 Claims, 3 Drawing Sheets

PASSENGER SEAT WITH SINGLE ACTUATOR SEAT MECHANISM

CROSS REFERENCE TO RELATED APPLICATIONS

This application is a continuation of, claims the benefit of, and incorporates by reference U.S. patent application Ser. No. 12/754,000 filed Apr. 5, 2010 entitled "Passenger Seat with Single Actuator Seat Mechanism" which is an non-provisional application claiming the benefit of and incorporating by reference U.S. provisional patent application No. 61/166,476 filed on Apr. 3, 2009 entitled "Aircraft Seat with Single Actuator Seat Mechanism."

TECHNICAL FIELD OF THE INVENTION

This invention relates generally to a reclining passenger seat, and more particularly to a passenger seat having a leg rest, seat pan, and seat back that are adjusted by a single powered actuator.

BACKGROUND OF THE INVENTION

Long-haul aircraft flights regularly fly non-stop to destinations 12-18 hours or more away from the origination point. At present, aircraft cabins provide various forms of reclining seats so that passengers are able to attain comfortable resting positions. Seat backs that simply recline by hinging back consume considerable space in the passenger cabin. Space in a passenger cabin is a limited resource in any craft, and is a particularly critical resource in a passenger aircraft due to fuel costs and price competition among airlines. A typical passenger desires both a low cost in flying and a comfortable experience.

The cost and complexity of a passenger seat is also a concern for aircraft operators because the expenses of purchasing, installing, and maintaining each piece of equipment on an aircraft affect the economic success of each operator. Passenger seats are needed that operate conveniently and cost efficiently. For example, where a seat has several adjustable components, several powered actuators might be dedicated to the components and each actuator would represent an expense in the purchase and maintenance of the seat.

Accordingly, there is a need for a passenger seat having a single actuator adjustment mechanism.

BRIEF SUMMARY OF THE INVENTION

According to at least one embodiment of the invention, a passenger seat includes a rigid frame, a seat pan supported by the frame and movable relative to the frame, a leg rest pivotally attached to a forward end of the seat pan, a seat back pivotally attached to a rearward end of the seat pan, and a single actuator linked to the leg rest such that extension of the actuator causes the leg rest to pivot forward, the seat pan to move forward, and the seat back to recline.

According to at least one embodiment, the passenger seat includes a y-shaped yoke having three pivotal attachment points by which the yoke is pivotally attached to the rigid frame, linked to the actuator, and linked to the leg rest, respectively.

According to at least one embodiment, the passenger seat includes a leg rest support link having a first end pivotally attached to the yoke and a second end pivotally attached to the leg rest such that the leg rest support link forces the leg rest to pivot forward as the actuator extends.

According to at least one embodiment, the passenger seat includes a lever rigidly attached to the seat back and pivotally attached to the rearward end of the seat pan such that the lever forces the lower end of the seat back to move forward with the seat pan as the actuator extends.

According to at least one embodiment, the passenger seat includes a seat back link having a first end pivotally attached to the lever and a second end pivotally attached to a rearward end of the rigid frame such that the lower end of seat back moves forward as the actuator extends.

According to at least one embodiment, the actuator is an electrically powered linear actuator.

According to at least one embodiment of the invention, a method of adjusting a passenger seat includes providing a passenger seat including a rigid frame, a seat pan supported by the frame and movable relative to the frame, a leg rest pivotally attached to a forward end of the seat pan, a seat back pivotally attached to a rearward end of the seat pan, and a single actuator linked to the leg rest. The method includes the step of activating the actuator such that extension of the actuator causes the leg rest to pivot forward, the seat pan to move forward, and the seat back to recline.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
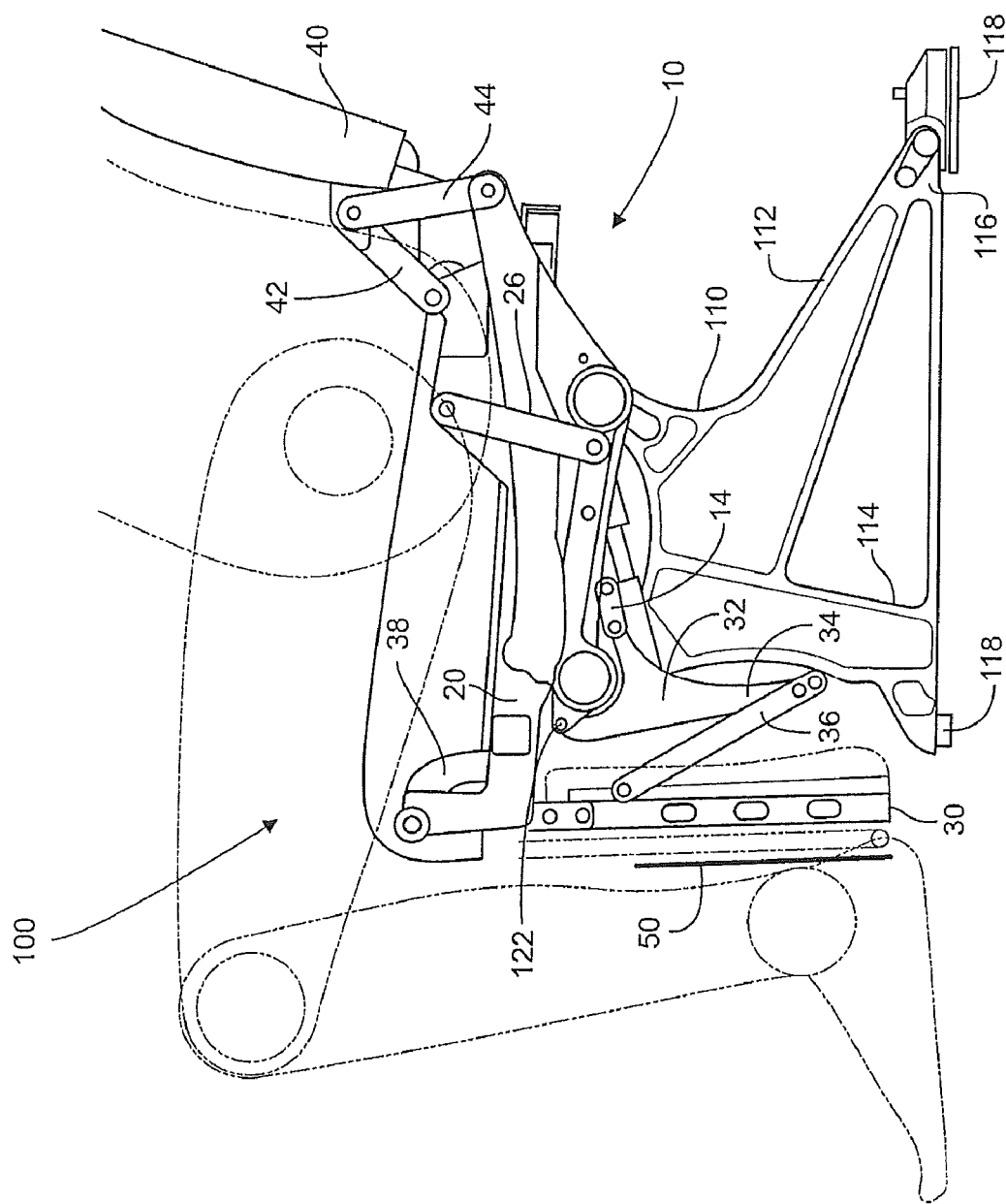
FIG. 1 is a side elevation view of a passenger seat according to at least one embodiment of the invention, shown in an upright TTL configuration.
Figure 2:
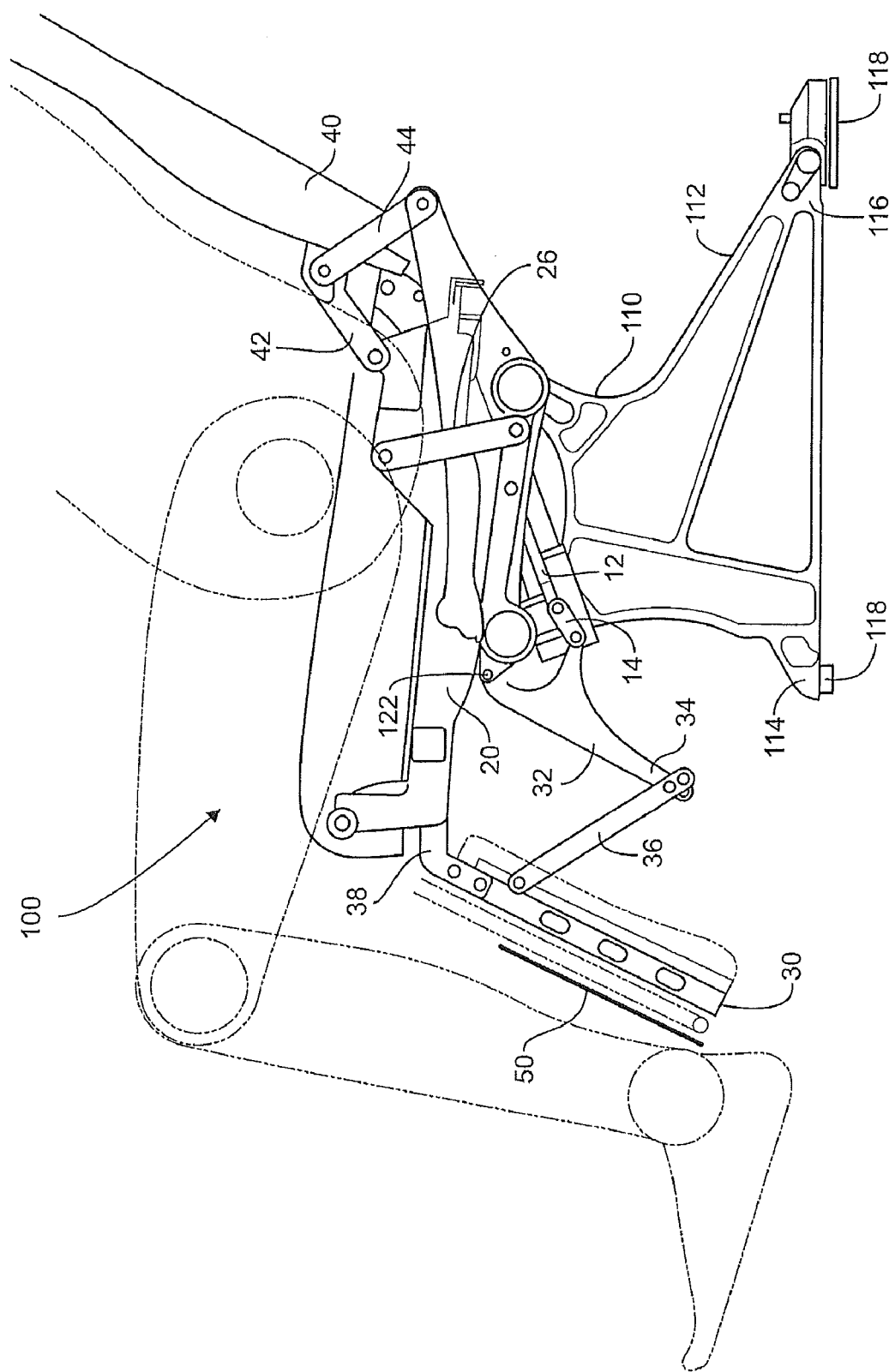
FIG. 2 is a side elevation view of the passenger seat of FIG. 1, shown in a partially reclined configuration.
Figure 3:
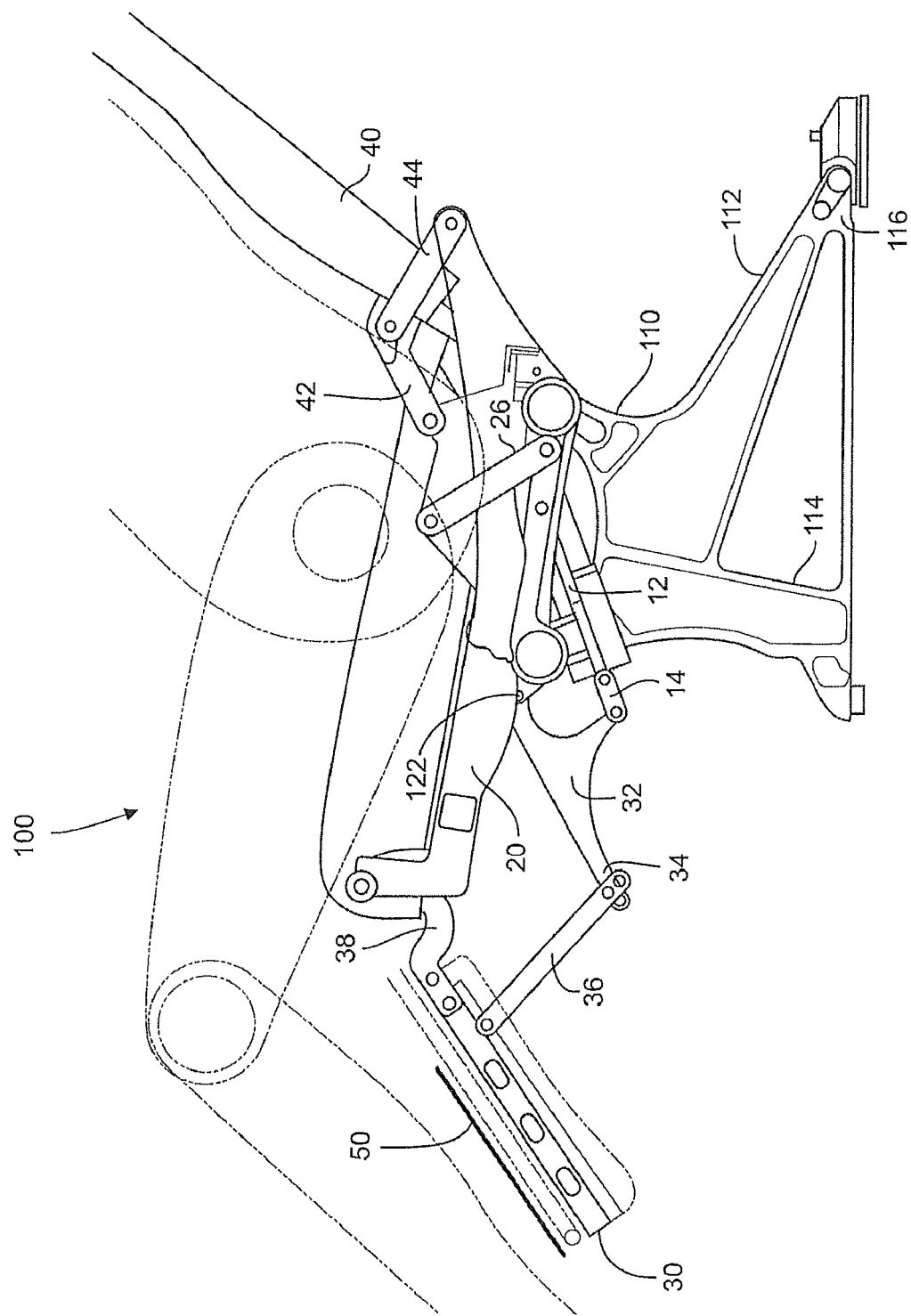
FIG. 3 is a side elevation view of the passenger seat of FIG. 1, shown in a maximally reclined configuration.

As shown in FIGS. 1-3, the passenger seat 100 includes a deployment mechanism 10 that coordinates movements of the seat pan 20, leg rest 30, and seat back 40 as the passenger seat is adjusted from the upright configuration of FIG. 1, through the partially reclined configuration of FIG. 2, to the maximally reclined configuration of FIG. 3. The deployment mechanism 10 is driven by a single linear actuator 12 that forcibly extends to drive the passenger seat toward the maximally reclined configuration of FIG. 3 and withdraws as the seat 100 is returned to the upright configuration of FIG. 1, which corresponds to the preferred configuration during the taxi, take-off, and landing (TTL) procedures of an aircraft. The linear actuator 12 in one particular example is an electrically powered actuator controlled by one or more buttons available to a seated passenger or vehicle crew members. The actuator 12 may be controlled by dedicated manual buttons or may be controlled by virtual buttons on a touchpad seating control interface device.

The passenger seat 100 is supported by a rigid frame 110 having upright leg assemblies 112 and tubular horizontal beams 114. Only one leg assembly 112 is illustrated in the drawings but it should be understood that any number of leg assemblies 112 can be arranged in a seating row to support one or multiple passenger seats 100. The horizontal beams 114 can extend to any preferred length, connecting adjacent leg assemblies 112 in a seating row. The leg 112 has a lower forward end 114 and lower rearward end 116 that terminate in respective anchors 118 by which the passenger seat 100 is secured to the deck of an aircraft or other vehicle. Thus, the rigid frame 110 may be considered as stationary with respect to the deck of a vehicle as the vehicle travels.

A leg rest drive link 14 is pivotally attached at its rearward end to the linear actuator 12 and at its forward end to a y-shaped leg rest pivot yoke 32, which is pivotally attached to the forward end of the frame 110 by a pin 122. Thus the yoke 32 is constrained to pivot about the pin 122 relative to the frame. The actuator 12 is pivotally connected at opposing ends thereof to the rigid frame 110 and the drive link 14. The drive link 14 forces the yoke 32 to pivot about the pin 122, thereby extending the distal end 34 of the yoke from the stowed TTL position of FIG. 1 to the deployed configuration of FIG. 3, as the actuator 12 extends to adjust the seat 100 toward the reclined configuration. The leg rest 30 is pivotally attached at its upper end 38 to the forward end of the seat pan 20, and is carried generally forward and upward as the seat pan travels from the TTL position of FIG. 1 to the reclined position of FIG. 3. A leg support link 36 is pivotally attached at its opposing ends to the distal end 34 of the yoke and the leg rest 30 respectively.

As shown when FIGS. 1-3 are taken sequentially, as the actuator 12 extends, pivoting the yoke 32 and raising the distal end 34 of the yoke, the leg rest 30 is deployed by the leg support link 36 toward a leg supporting position by pivoting about the forward end of the seat pan 20. With the seat 100 in the maximally reclined configuration shown in FIG. 3, the angle of the leg rest 30 with respect to horizontal reaches approximately 30 degrees in one particular example. The resulting angle of the leg rest 30 with respect to horizontal may be customized by adjusting either the length of the leg rest support link 36 or the position at which the leg rest support link attaches to leg rest 30. To provide a more vertical leg rest 30 when the maximally reclined configuration of the seat 100 is reached, the leg rest support link 36 may either be shortened or attached closer to the floor.

A deployable footrest 50 is pivotally attached to the distal end of the leg rest 30 for extending the length of the leg rest 30 and supporting the feet of a passenger. The footrest 50 may be a selectively deployed by the seat occupant, or may be automatically deployed as the seat 100 is adjusted from the TTL configuration to a reclined configuration.

Simultaneously with the deployment of the leg rest 30 as the actuator 12 extends, the seat pan 20 is pulled forward by the upper end 38 of the leg rest 30. Movement of the seat pan 20 is guided by a seat pan link 26 and a roller that bears upon the lower surface of the seat pan. When the actuator 12 extends to recline the seat 100, the seat pan link 26 guides the seat pan 20 forward, by approximately 4 inches in one particular example, with respect to the stationary frame 110. In moving from its TTL position in FIG. 1 to its maximally reclined position in FIG. 3, the seat pan moves forward overall, with its forward end raising and its rearward end lowering for the comfort of a seated passenger.

An angled lever 42 defines a lower portion of the seat back 40. The forward lower end of the lever 42 is pivotally attached to a rearward portion of the seat pan 20 and travels with the movement of the seat pan. A seat back link 44 has a first end pivotally attached to the lever 42 and a second end pivotally attached to the rearward and upper end of the stationary frame 110. The forward movement of the seat pan 20 in turn causes the lever 42 to move forward. With the seat back 40 guided by the seat back link 44 and moved under the forces applied by the lever 42 as the seat 100 is adjusted from the TTL configuration of FIG. 1 to the maximally reclined configuration of FIG. 3, the lower end of the seat back 40 moves forward and downward. The upper end of the seat back 40 travels downward and rearward. In one particular example, the upper end of the seat back 40 travels approximately 4-5 inches. The seat back 40 overall leans back as the maximally reclined configuration of FIG. 3 is approached. In one example, the seat back 40 maximally reclines approximately 20 degrees from its TTL configuration and approximately 41 degrees from vertical. The deployment mechanism 10 of the present invention provides a greater recline angle in the same amount of space as compared to conventional seat mechanisms.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A passenger seat comprising:
   (a) a rigid frame;
   (b) a seat pan linked to the frame and movable relative to the frame;
   (c) a leg rest directly pivotally attached to a forward end of the seat pan;
   (d) a seat back pivotally attached to the frame and to a rearward end of the seat pan;
   (e) a single actuator pivotally attached to the frame and linked to the leg rest; and
   (f) a yoke having three pivotal attachment points by which the yoke is pivotally attached to the rigid frame, linked to the actuator, and linked to the leg rest, respectively, such that extension of the actuator causes the yoke to pivot, causing the leg rest to pivot forward, the seat pan to move forward, and the seat back to recline.

2. A passenger seat according to claim 1, further comprising a leg rest support link having a first end pivotally attached to the yoke and a second end pivotally attached to the leg rest such that the leg rest support link forces the leg rest to pivot forward as the actuator extends.

3. A passenger seat according to claim 1, further comprising a lever rigidly attached to the seat back and pivotally attached to the rearward end of the seat pan such that the lever forces the lower end of the seat back to move forward with the seal pan as the actuator extends.

4. A passenger seat according to claim 3, further comprising a seat back link having a first end pivotally attached to the lever and a second end pivotally attached to a rearward end of the rigid frame such that the lower end of seat back moves forward as the actuator extends.

5. A passenger seat according to claim 1, wherein the actuator is an electrically powered linear actuator.

6. A method of adjusting a passenger seat comprising:
   (a) providing a passenger seat including:
      (i) a rigid frame;
      (ii) a seat pan linked to the frame and movable relative to the frame;
      (iii) a leg rest directly pivotally attached to a forward end of the seat pan;
      (iv) a seat back pivotally attached to the frame and to a rearward end of the seat pan;
      (v) a single actuator pivotally attached to the frame and linked to the leg rest; and
      (vi) a yoke having three pivotal attachment points by which the yoke is pivotally attached to the rigid frame, linked to the actuator, and linked to the leg rest, respectively; and (b) activating the actuator such that extension of the actuator causes the yoke to pivot, causing the leg rest to pivot forward, the seat pan to move forward, and the seat back to recline.

7. A method according to claim 6, wherein the passenger seat comprises a leg rest support link having a first end pivotally attached to the yoke and a second end pivotally attached to the leg rest such that the leg rest support link forces the leg rest to pivot forward as the actuator extends.

8. A method according to claim 6, wherein the passenger seat comprises a lever rigidly attached to the seat back and pivotally attached to the rearward end of the seat pan such that the lever forces the lower end of the seat back to move forward with the seat pan as the actuator extends.

9. A method according to claim 8, wherein the passenger seat comprises a seat back link having a first end pivotally attached to the lever and a second end pivotally attached to a rearward end of the rigid frame such that the lower end of seat back moves forward as the actuator extends.

10. A method according to claim 6, wherein the actuator is an electrically powered linear actuator.

11. A passenger seat comprising:
    (a) a rigid frame;
    (b) a seat pan linked to the frame and movable relative to the frame;
    (c) a leg rest pivotally attached to a forward end of the seat pan;
    (d) a seat back pivotally attached to the frame and to a rearward end of the seat pan;
    (e) a single actuator pivotally attached to the frame and linked to the leg rest such that extension of the actuator causes the leg rest to pivot forward, the seat pan to move forward, and the seat back to recline; and
    (f) a yoke having a plurality of pivotal attachment points by which the yoke is pivotally attached to the rigid frame, linked to the actuator, and linked to the leg rest.

12. A passenger seat according to claim 11, further comprising a leg rest support link having a first end pivotally attached to the yoke and a second end pivotally attached to the leg rest such that the leg rest support link forces the leg rest to pivot forward as the actuator extends.

13. A passenger seat according to claim 12, further comprising a seat back link having a first end pivotally attached to the lever and a second end pivotally attached to a rearward end of the rigid frame such that the lower end of seat back moves forward as the actuator extends.

14. A passenger seat according to claim 12, wherein the actuator is an electrically powered linear actuator.

15. A passenger seat according to claim 11, further comprising a lever rigidly attached to the seat back and pivotally attached to the rearward end of the seat pan such that the lever forces the lower end of the seat back to move forward with the seat pan as the actuator extends.

* * * * *